United States Patent [19]

Frankenfield

[11] 4,379,650
[45] Apr. 12, 1983

[54] ANCHORING MEANS FOR WALL BRACES

[75] Inventor: David J. Frankenfield, Burlingame, Calif.

[73] Assignee: The Burke Company, San Mateo, Calif.

[21] Appl. No.: 183,724

[22] Filed: Sep. 2, 1980

[51] Int. Cl.³ ............................................. F16B 35/04
[52] U.S. Cl. ...................................... 403/316; 52/704; 411/400; 411/385
[58] Field of Search ...................... 403/316, 317, 408; 52/704, 711, 150, 146, 126, 745; 411/400, 385

[56] References Cited

U.S. PATENT DOCUMENTS

| | | |
|---|---|---|
| 361,927 | 4/1887 | Cartright . |
| 560,329 | 5/1896 | Sherman . |
| 880,962 | 3/1908 | Blanchard et al. . |
| 1,409,524 | 3/1922 | Chase . |
| 2,446,030 | 7/1948 | Tunnard-Moore . |
| 2,563,164 | 8/1951 | Fletcher . |
| 2,570,928 | 10/1951 | Fisher . |
| 2,699,354 | 1/1955 | Kok . |
| 3,043,411 | 7/1962 | Wyrough . |
| 3,204,514 | 9/1965 | Sauvet ................................. 411/385 |
| 3,300,943 | 1/1967 | Owens ............................. 52/745 X |
| 3,652,118 | 3/1972 | Goldberg . |
| 4,011,638 | 3/1977 | Holt . |

FOREIGN PATENT DOCUMENTS

| | | |
|---|---|---|
| 1800807 | 9/1970 | Fed. Rep. of Germany . |
| 405203 | 2/1934 | United Kingdom ................ 411/385 |
| 595090 | 11/1947 | United Kingdom . |
| 509516 | of 1976 | U.S.S.R. . |

Primary Examiner—Andrew V. Kundrat
Attorney, Agent, or Firm—Naylor, Neal & Uilkema

[57] ABSTRACT

The foot plates of a tilt-up wall bracing system are anchored to a concrete floor slab by means which positively clamp the floor slab to the foot plates. The clamping means include a throughbore in the floor slab, a threaded and L-shaped anchor bolt, a wedging spike, and a nut in threaded engagement with the anchor bolt.

7 Claims, 3 Drawing Figures

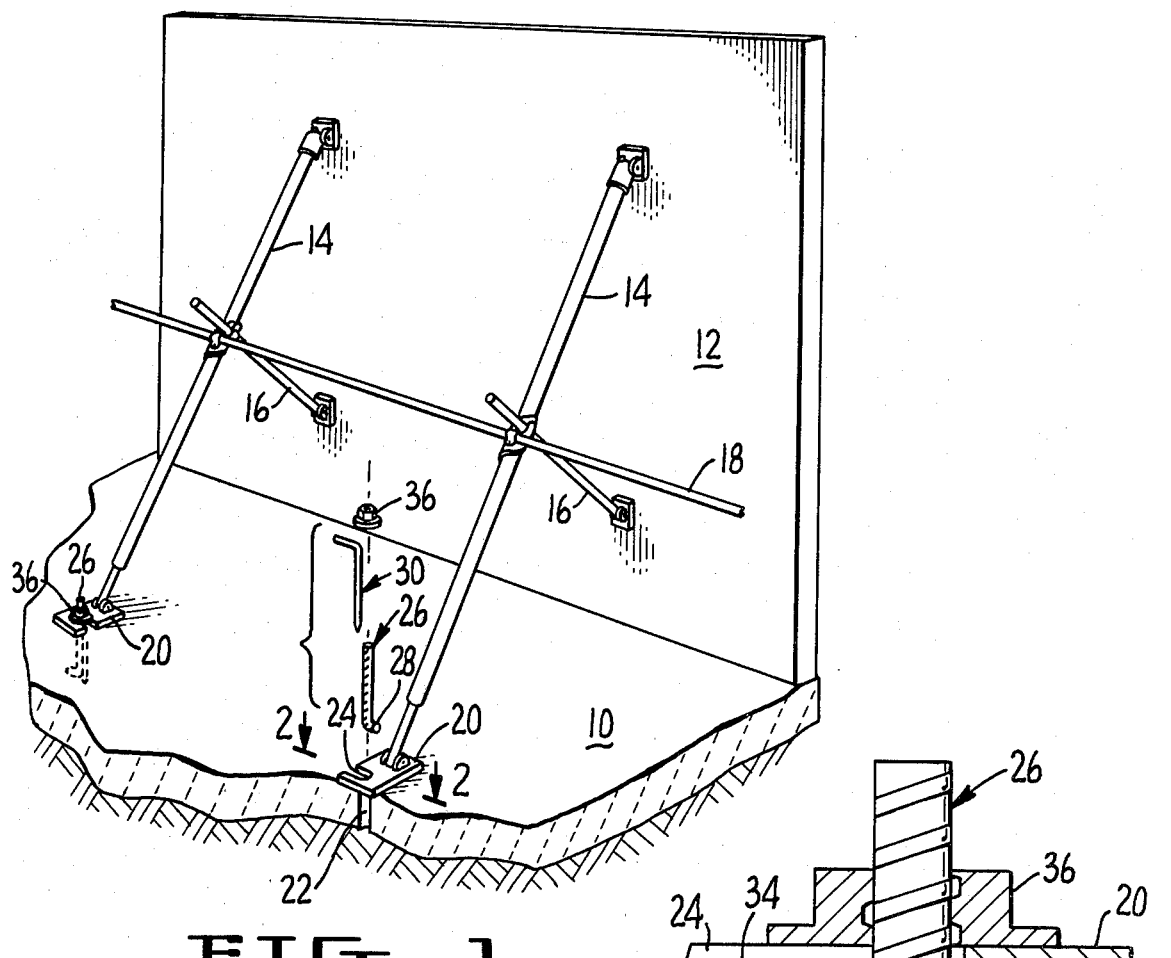
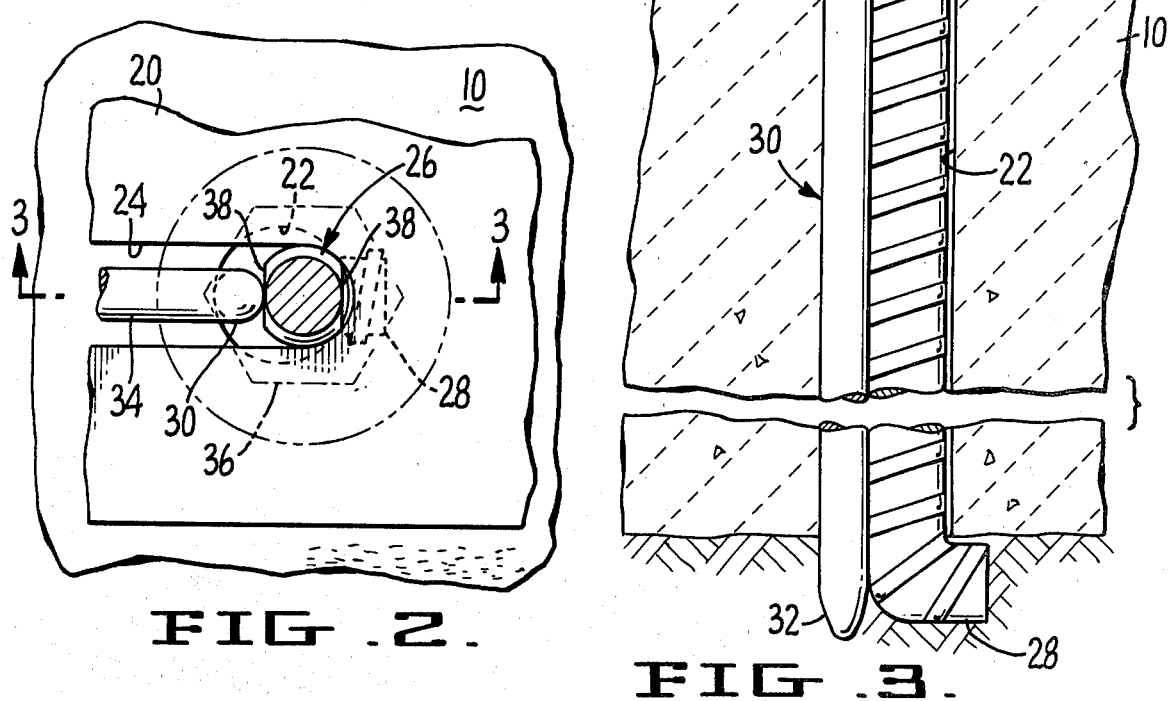

ANCHORING MEANS FOR WALL BRACES

BACKGROUND OF THE INVENTION

Concrete wall slabs in tilt-up construction are temporarily braced in a vertical position until they can be tied together with other construction units. A conventional bracing system comprising tilt-up braces, knee braces and lace braces is shown and described in detail in U.S. Pat. No. 4,011,638. The foot portions of the tilt-up braces of that and other conventional bracing systems are secured to a concrete floor slab by one form or another of expansion anchors. Anchors of that type adequately serve the purpose if they are properly and carefully installed. Such expansion anchors are frequently reduced in strength to a substantial degree for one reason or another, such as making the expansion anchor holes oversized, insufficient torqueing of the bolts, and so on. Such expansion anchors can also be loosened by wind buffeting or by bumping into a braced wall panel or slab when an adjoining panel is being set and braced.

SUMMARY OF THE INVENTION

The improved anchor means of the present invention provides for a fully positive connection between the wall brace and the floor slab, i.e. a connection which does not depend upon frictional holding forces. With the anchor means of the present invention, a force exceeding the strength of the entire slab bracing system would be required to pull the anchor means out of the floor slab.

The essential object of the invention is therefore to provide a high strength, fully positive connection between a wall slab bracing system and a floor slab.

This and other objects and advantages of the invention will be apparent from the following description taken in conjunction with the drawing forming part of this specification.

DESCRIPTION OF THE DRAWING

FIG. 1 is a view in perspective of a tilt-up wall slab and bracing means therefor including the anchor means of the invention.

FIG. 2 is an enlarged view taken along lines 2—2 of FIG. 1.

FIG. 3 is a view taken along lines 3—3 of FIG. 2, the anchor bolt and spike wedge elements being shown in elevation.

DESCRIPTION OF THE PREFERRED EMBODIMENT

Referring to the drawing, the invention is shown in an environment which includes a concrete floor slab 10 and a concrete wall slab 12, the latter having been poured in a horizontal position and then tilted into a vertical position after curing. During fabrication, the wall slab 12 is provided with anchors, in the form of screw sockets or the like of the type shown in U.S. Pat. No. 3,590,538, to facilitate attachment of tilt-up braces 14 and knee braces 16. Lace brace 18 forms the third of a three-component brace system which is illustrated and described in full detail in U.S. Pat. No. 4,011,638. The lower ends of tilt-up braces 14 have shoe plates 20 pivotally connected thereto. The present invention is concerned with anchor means forming a positive interconnection between shoe plates 20 and slab 10.

The anchor means of the invention comprises a cylindrical bolt hole 22 which extends completely through slab 10, an open-ended slot 24 formed in shoe plate 20, externally threaded anchor bolt 26 having a right-angled foot portion 28 adapted to extend radially beneath slab 10, as shown in FIG. 3, a wedge 30 formed of rod stock and having a spike end 32 and a right-angled upper extension 34 adapted to overlie slab 10 and reside within slot 24 of shoe plate 20, and a flanged nut 36 adapted to be threadably engaged with the anchor bolt 26 and thereby place the slab 10 under conpression between plate 20 and anchor bolt foot 28.

The anchor bolt 26 preferably is formed out of concrete reinforcement bar stock which is provided by hot rolling with a screw thread, the bolt having diametrically opposed flats 38.

The anchor means is quickly and efficiently installable. Bolt 26 is passed through slot 24 and hole 22. Wedge element 30 is then passed through slot 24 and hole 22 to lock the bolt 26 along one side of hole 22 with the foot element 28 of the bolt disposed in interlocking relation with the underside of slab 10. The wedge 30 bears against one of the flats 38 of the anchor bolt, as shown in FIG. 2. The resulting line contact between wedge 30 and bolt 26 keeps any binding or jamming between these elements to a minimum. The nut 36 is then attached to the bolt and tightened against the shoe plate 20, thereby also locking the wedge element 30 in place.

Due to the presence of slot 24, elements 26 and 30 may be emplaced before the shoe plate 20 is brought into the emplacement position of FIG. 3. Alternatively, shoe plate 20 may be provided with an elongated aperture to accommodate elements 22 and 30 rather than with the open-ended slot 24.

It will be appreciated that the anchor means of the invention provides an extremely strong and positive anchor connection between the floor slab and the bracing system for the wall slab. The strength of the anchor is essentially equal to the resistance of the foot portion 28 of the anchor bolt to being shorn off. This means that the force required to pull the bolt free of the FIG. 3 position would exceed the strength of the brace 14.

What is claimed is:

1. In a bracing system for tilt-up wall slabs including a floor slab-engaging foot plate to which a tilt-up brace is pivotally attached, the combination with said foot plate of a cylindrical bore formed in a floor slab and extending fully therethrough, an aperture in said foot plate in registry with said bore, a threaded anchor bolt having at least one side which is essentially flat and unthreaded removably extending through said aperture and fully through said bore, said bolt having an abbreviated foot portion extending laterally into underlying relation to the floor slab, the horizontal dimension of said bolt taken through said foot portion being somewhat less than the diameter of said bore to enable emplacement of said bolt through said bore and removal of said bolt therefrom, an anchor bolt-wedging spike removably extending fully through said bore and against said essentially flat and unthreaded side of the bolt to maintain said bolt to one side of said bore and to maintain said foot portion in underlying relation to the floor slab, said spike having a right-angled head portion at its upper end adapted to engage the upper surface of the floor slab and to be disposed within said aperture of said foot plate, and a nut bearing against the foot plate in removably threaded engagement with said anchor bolt and operable while in place to prevent the removal of said spike from said aperture and said bore.

2. The combination of claim 1, the surface of said spike in engagement with said bolt being arcuate.

3. The combination of claim 2, said aperture in said foot plate being in the form of a slot having one open end.

4. Anchor means adapted to secure the foot plate of wall bracing means to a floor slab comprising, in combination with said foot plate, a throughbore in said floor slab, an aperture in said foot plate in registry with said throughbore, a threaded anchor bolt having at least one side which is essentially flat and unthreaded extending through said aperture and throughbore and having a distal end portion extending into underlying relation to the floor slab, bolt-wedging means removably extending through said aperture and said throughbore and having an arcuate surface against said essentially flat and unthreaded side of the bolt to lock the distal end portion of said bolt in underlying relation to the floor slab, and a nut bearing against the foot plate in removably threaded engagement with said anchor bolt and operable while in place to prevent the removal of said boltmeans from said aperture and throughbore.

5. The combination of claim 4, said wedging means comprising a spike having a laterally extending proximal end adapted to be engaged with and supported by the upper surface of the floor slab.

6. The combination of claim 5, said aperture in said foot plate being in the form of a slot having one open end.

7. An anchor bolt of the type described comprising a predetermined length of rebar stock having a hot rolled screw thread, said bolt having along its length an essentially unthreaded and flat side and having at its distal end a laterally extending foot portion having a length less than the diametral dimension of said bolt.

* * * * *